United States Patent [19]
Lawrence

[11] Patent Number: 5,105,325
[45] Date of Patent: Apr. 14, 1992

[54] GROUND-SAFETY CONTROLLER

[75] Inventor: Lucas G. Lawrence, San Bernardino, Calif.

[73] Assignee: Daniel J. Bondy, Las Vegas, Nev.

[21] Appl. No.: 520,274

[22] Filed: May 7, 1990

[51] Int. Cl.$^5$ ............................................. H02H 3/14
[52] U.S. Cl. .................................... 361/42; 361/49
[58] Field of Search ................ 361/42, 49, 50, 46; 340/649, 650, 651

[56] References Cited

U.S. PATENT DOCUMENTS

| | | | |
|---|---|---|---|
| 3,290,668 | 8/1963 | Perretta | 340/649 |
| 3,996,496 | 12/1976 | Volk, Jr. | 361/49 |
| 4,034,267 | 7/1977 | Wilson | 361/44 |
| 4,093,977 | 6/1978 | Wilson | 361/44 |
| 4,234,900 | 11/1980 | Miyazaki et al. | 361/45 |
| 4,344,100 | 8/1982 | Davidson et al. | 361/45 |
| 4,580,186 | 4/1986 | Parker et al. | 361/42 |
| 4,598,331 | 7/1986 | Legatti | 361/46 |
| 4,709,293 | 11/1987 | Gershen | 361/50 |
| 4,829,289 | 5/1989 | Kallman et al. | 340/656 |
| 4,855,860 | 8/1989 | Nilssen | 361/45 |

Primary Examiner—A. D. Pellinen
Assistant Examiner—C. S. Schultz
Attorney, Agent, or Firm—Christie, Parker & Hale

[57] ABSTRACT

A ground-safety controller circuit containing a thyristor that senses grounding of electrical equipment and enables interruption of power to the equipment.

9 Claims, 1 Drawing Sheet

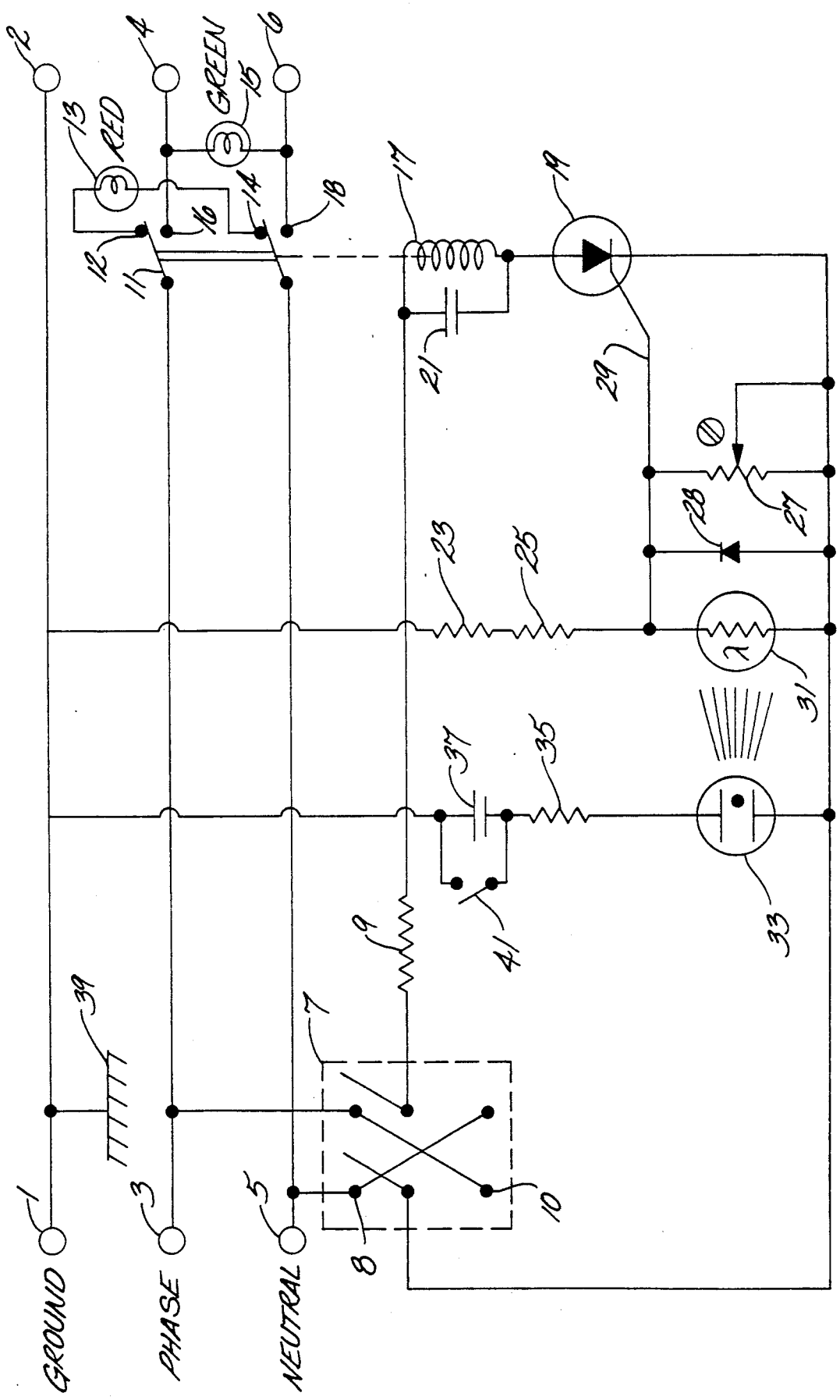

GROUND-SAFETY CONTROLLER

BACKGROUND OF THE INVENTION

1. Field of the Invention

The invention relates to ground-fault interrupter systems and, more particularly, to the sensing of the grounding of electrical equipment. Still more particularly, the invention relates to a system for discontinuing power to electrical equipment when grounding of the equipment is interrupted.

2. Description of the Prior Art

Ground safety controllers are used to offer protection against anomalous electrical conditions which may arise, for example, when an electric voltage is impressed upon equipment with respect to the ground. If there is ineffective grounding, a dangerous electrical shock can result which may cause injury or death.

Various devices to interrupt power are available to prevent such incidents. They generally include differential amplifiers, transformers or similar systems. Usually, however, such systems operate only after the fault situation has occurred. A variety of ground-fault indicator or interrupter circuits are disclosed in the prior art. For example, an invertor-type ballast with built in differential current transformer to sense substantive differences in currents flowing from each of two output terminals is disclosed in Nilssen U.S. Pat. No. 4,855,860. Wilson U.S. Pat. No. 4,093,977 discloses a self powered, self-contained ground fault protective device with a circuit for monitoring ground fault current and a ground integrity monitor for an electric apparatus is disclosed in Volk, Jr., U.S. Pat. No. 3,996,496.

It is desirable to provide a system in which total disablement of the equipment occurs if a true earth ground is absent and for immediate interruption of equipment functions if electro-magnetic interference is generated.

SUMMARY OF THE INVENTION

The present invention provides a system for interrupting power at the electrical equipment when grounding of the equipment is interrupted. In accordance with the invention, a system is provided for preventing the equipment from being turned on if a true earth ground is absent and, if a true earth ground is present and the equipment generates radio interferences during its operation, for disabling the equipment.

A circuit is provided for sensing the grounding of electrical equipment which comprises: a source of electric power, a light source, means for connecting the light source between the source of power and a true earth ground, photo sensitive means connected to the source of power positioned in operative relationship with the light source for receiving a control signal from said source, and relay means connected in series circuit relationship with the photo sensitive means for interrupting power at the electrical equipment when grounding of the equipment is interrupted.

The invention is especially useful where appliances and industrial machines are involved. In a presently preferred application of the invention, the ground-safety controller of the invention may be advantageously employed with high voltage termite control devices such as are disclosed in U.S. Pat. Nos. 4,223,468, 4,366,644, and 4,782,623. Such devices operate to control pests such as termites by the application of a broad-band, high-voltage electrical energy to the shelter tubes harboring such pests and to the pests themselves. These apparatus generally comprise a probe gun incorporating circuitry for generating an electric signal having a voltage in the 100,000 volt range and a frequency range of 0–500 kHz. In such applications it is especially important not only to protect equipment operators against electrical shock due to ungrounded equipment, but also to prevent equipment damage such as may be caused by internal arc-overs resulting from lack of grounding. Because of the especially hazardous situations in which the equipment is used, it is particularly important to employ very reliable ground-safety controllers.

The system of the invention incorporates the high-gain characteristics of thyristors to reliably sense exceedingly low currents. Moreover, it is also possible to manually select the proper polarity of the feeding power line. The gate circuit of the thyristor may be energized by direct current feed from the ground line, or alternately, the direct current feed may be shunted and turned off by means of a photoelectric cell illuminated by a suitable lamp e.g., a neon lamp. The neon lamp advantageously contains a reactive impedance in the form of a capacitor in the feeder line. If high frequency currents are present, the neon lamp is energized which in turn activates the photoelectric cell. The low electrical resistance of the cell shunts the thyristor gate causing an associated relay to open the power line. Since only micro-amperes are utilized in all sensing functions, the ground-safety controller of the invention creates no electrode biological hazards to equipment operators. Moreover, since high-impedance circuitry is utilized and sensing diodes are not used, safety hazards which may result from diode failures are avoided.

BRIEF DESCRIPTION OF THE DRAWING

FIG. 1 is a schematic diagram of the electrical circuitry in accordance with a preferred embodiment of the invention.

DESCRIPTION OF PREFERRED EMBODIMENT

The ground safety controller comprises a three wire system including a ground line, a phase line and a neutral line. The ground line is connected to the chassis of the equipment involved and the phase and neutral lines are connected to a DPDT power relay. When the relay is in the OFF position, contacts are energized to cause a signal light to be lit. It is evident that no power is supplied to output terminals at this time. To operate the ground safety controller, it is necessary that a true earth ground be connected to the ground input terminal and that the proper line polarity be selected by suitable polarity reversal means such as a toggle switch. The switch ascertains the "hot" or phase position of the feeder line which is generally unknown or may be wired incorrectly.

As can be seen in FIG. 1, the ground-safety controller comprises ground line 1, phase line 3 and neutral line 5. Ground line 1 is connected to a thyristor circuit comprising thyristor 19, thyristor gate 29, photoelectric cell 31 and high-ohm sensing resistors 23 and 25. Also provided is a light source, such as a neon lamp circuit, including neon lamp 33 and suitable responsive photosensitive means such as photoelectric cell 31; dropping resistor 35 and a capacitor 37 connected to an optional switch 41. A power relay coil 17 energized by voltage fed over from resistors 23 and 25 to the thyristor gate 29 is provided along with a capacitor 21 and a series resistor 9. A diode 28 is provided for rectification and balance.

Phase line 3 is connected to a relay switch 11 which may energize contact 12 to activate signal light indicators such as red and green lights 13 and 15, respectively, engageable by the power relay's DPDT contact switch to positions 16 and 18 (which may energize either red light 13 or green light 15), both of which are connected to output terminals 4 and 6, respectively.

The phase line 3 is also connected to a circuit activated by toggle switch 7 for preliminary testing. The toggle switch provides phase-reversed switching current for the power relay coil 17 via resistor 9.

In order to operate the ground safety controller, a true earth ground is connected to the ground input terminal and the proper line polarity is selected by polarity reversal means such as toggle switch 7. The toggle switch 7 is required to determine the "hot" or phase position of the feeder line. If, for example, phase line 3 is actually neutral, no net potential can exist between the phase line and the ground line and the result is that the ground safety controller will not be activated. No power output will be provided at terminals 4 and 6, even with a true earth ground connected to terminal 1.

Under normal conditions with all grounding and phase conditions correct, a typical potential of, for example, 117 VAC will exist between ground line 1 and phase line 3. This voltage will be fed over two high-ohm sensing resistors 23 and 25 to thyristor gate 29 of the thyristor 19 causing the thyristor to energize the relay coil 17. The relay coils DPDT contacts then switch to positions 16 and 18, which causes activation of the equipment connected to output terminals 4 and 6. The relay switching current is attenuated by resistor 9 and the capacitor 21 is connected in parallel to the relay coil 17 to prevent relay chatter due to the functioning of pulsing thyristor 19.

Additionally connected to thyristor gate 29 are a balancing resistor 27, a diode 28, and a photoelectric cell 31. The light-to-dark ratio of the photoelectric cell 31 is typically 1:22,000. The cell 31 acts as a resistive shunt which becomes active when illuminated by neon lamp 33. The lamp circuit is fashioned in such a way as to be sensitive to radio-frequency interference prevailing in the ground line. However, it may also be used for earth-ground sensing functions by closing optional switch 41.

In the mode of operation, in which only the RF interference is sensed, a capacitor 37 is utilized as a high frequency sensing means to provide a low impedance at high frequencies and a high impedance at power line frequencies so as to cause the neon lamp to light up or to remain dark, respectively. When using a capacitor of, for example, 64.7 pf, a reactance of about 60,000 ohms would be provided at 41,000 kHz; whereas the reactance would rise to over 4.1 megohms on a line frequency of 60 Hz. In the latter case, the resistance would be too high to effectively energize the neon lamp 33 over its dropping resistor 35. If the neon lamp 33 illuminates the photoelectric cell 31, the latter's resistance in the ON condition drops to a low value and effectively shunts the gate 29 of the thyristor 19 to cathode potential. The result is that the power relay 17 drop out and the connected equipment would be in the "OFF" state. Cyclic functions between ON/OFF conditions can be determined by appropriate selection of time constants (t=RC) for capacitor 21 and resistor 9. The cyclic ON/OFF is visually confirmed by lamps 13 and 15 showing red for OFF and green for ON, respectively.

As indicated previously, the invention is useful to prevent electric shock and/or unsafe operating conditions due to absence of earth ground. In such a case, the connected equipment cannot be turned on and operated if no earth ground is present. If feed lines or cables are connected as depicted in FIG. 1, the ground line 1 is not connected to a true earth ground, and the red light 13 would be lit. The operator would then flip the toggle switch 7 for preliminary testing. A no-ground condition would be prevailing if the red light continues to remain lit and must be rectified. Once the operator has attached a viable ground line, the toggle switch is activated again to establish proper phase polarity verses ground. If the system is operating correctly, the green light 15 would then be lit and the equipment would be ready for safe operation.

If radio interference is present, the controller will go into a cyclic mode causing the red (OFF) and green (ON) lights to be lit alternately. These cyclic conditions will continue until the interference has been corrected.

It is apparent that since no sensing diodes and similar circuit elements are used, the ground-safety controller of the invention, is intrinsically safe to operate. Electrobiological shock hazards are eliminated and the controller shut offs immediately when the earth ground is removed and signals the OFF condition to the equipment operator. Restoring the ground to the circuit restores the equipment operation.

It is apparent from the foregoing that various changes and modifications may be made without departing from the invention. Accordingly, the scope of the invention should be limited only by the appended claims wherein:

What is claimed is:

1. A circuit for sensing the grounding of electrical equipment comprising:
   a source of electric power comprising a phase line and a neutral line;
   polarity reversal means coupled to the phase line and the neutral line for selectively providing signals from the phase line and neutral line at normal or reverse polarity;
   a light source directly coupled to the polarity reversal means and through high frequency sensing means to a true earth ground;
   photosensitive means connected to the source of power and coupled to the light source for receiving a control signal from the light source; and
   relay means coupled to the photosensitive means for interrupting power to the electrical equipment when grounding of said equipment is interrupted.

2. A circuit according to claim 1 wherein voltage from the electric power source is coupled to a thyristor and said relay means is responsive to said thyristor.

3. A circuit according to claim 2 further comprising at least one high-ohm sensing resistor interposed between said true earth ground and the gate of said thyristor.

4. A circuit according to claim 3 further comprising a balancing resistor and diode connected to said thyristor and photosensitive means.

5. The circuit of claim 1, wherein the polarity reversal means is a double-throw double-pole switch having a first contact coupled to the phase line and a second contact coupled to the neutral line.

6. The circuit of claim 1, wherein the high frequency sensing means is a capacitor.

7. The circuit of claim 1, wherein the polarity reversal means is coupled to a relay means and a thyristor, the relay means being responsive to the thyristor.

8. The circuit of claim 7, further including at least one high-ohm-value resistor coupled between a gate of the thyristor and the true earth ground.

9. The circuit of claim 6, wherein the capacitor has a value of about 64 pl picofarads.

* * * * *

UNITED STATES PATENT AND TRADEMARK OFFICE
CERTIFICATE OF CORRECTION

PATENT NO. : 5,105,325
DATED : April 14, 1992
INVENTOR(S) : Lucas G. Lawrence

It is certified that error appears in the above-indentified patent and that said Letters Patent is hereby corrected as shown below:

The title page should be deleted to appear as per attached title page.

The sheet of Drawing should be deleted to appear as per attached sheet.

United States Patent [19]

Lawrence

[11] Patent Number: 5,105,325

[45] Date of Patent: Apr. 14, 1992

[54] GROUND-SAFETY CONTROLLER

[75] Inventor: Lucas G. Lawrence, San Bernardino, Calif.

[73] Assignee: Daniel J. Bondy, Las Vegas, Nev.

[21] Appl. No.: 520,274

[22] Filed: May 7, 1990

[51] Int. Cl.⁵ .................................................. H02H 3/14
[52] U.S. Cl. ................................................. 361/42; 361/49
[58] Field of Search ............... 361/42, 49, 50, 46; 340/649, 650, 651

[56] References Cited

U.S. PATENT DOCUMENTS

| | | | |
|---|---|---|---|
| 3.290.668 | 8/1963 | Perretta | 340/649 |
| 3.996.496 | 12/1976 | Volk, Jr. | 361/49 |
| 4.034.267 | 7/1977 | Wilson | 361/44 |
| 4.093.977 | 6/1978 | Wilson | 361/44 |
| 4.234.900 | 11/1980 | Miyazaki et al. | 361/45 |
| 4.344.100 | 8/1982 | Davidson et al. | 361/45 |
| 4.580.186 | 4/1986 | Parker et al. | 361/42 |
| 4.598.331 | 7/1986 | Legatti | 361/46 |
| 4.709.293 | 11/1987 | Gershen | 361/50 |
| 4.829.289 | 5/1989 | Kallman et al. | 340/656 |
| 4.855.860 | 8/1989 | Nilssen | 361/45 |

Primary Examiner—A. D. Pellinen
Assistant Examiner—C. S. Schultz
Attorney, Agent, or Firm—Christie, Parker & Hale

[57] ABSTRACT

A ground-safety controller circuit containing a thyristor that senses grounding of electrical equipment and enables interruption of power to the equipment.

9 Claims, 1 Drawing Sheet

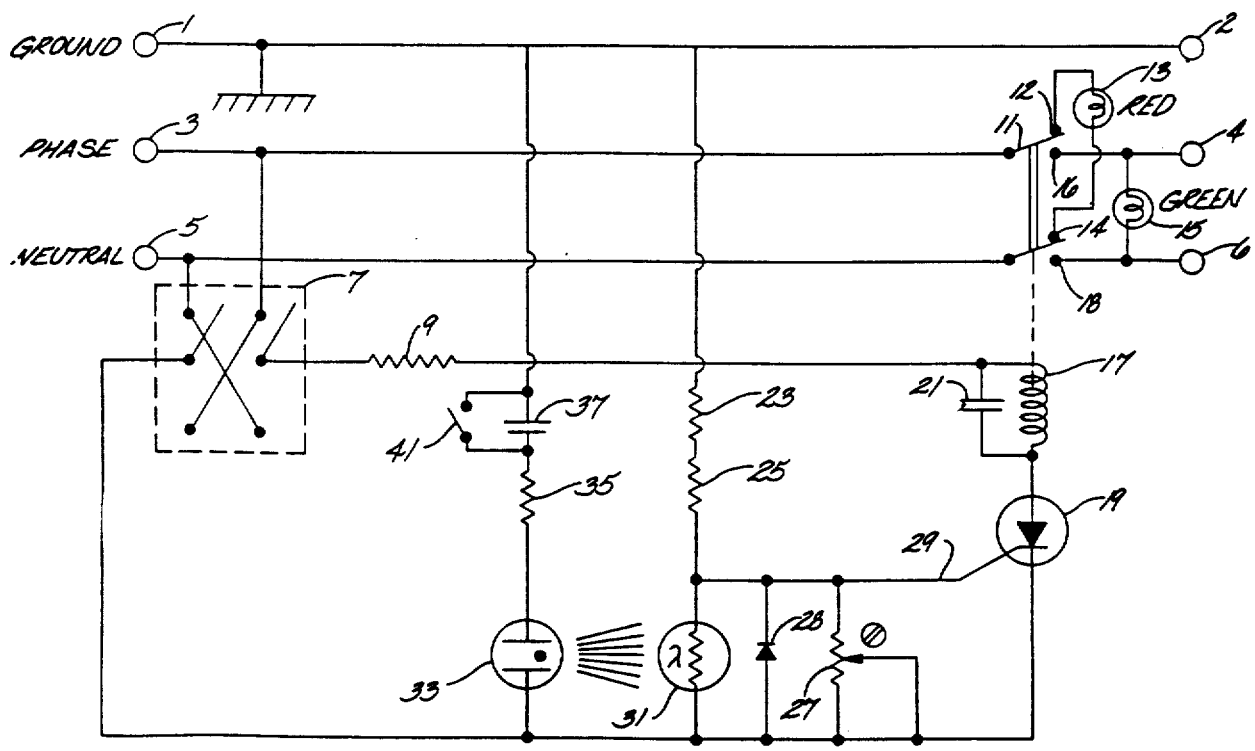

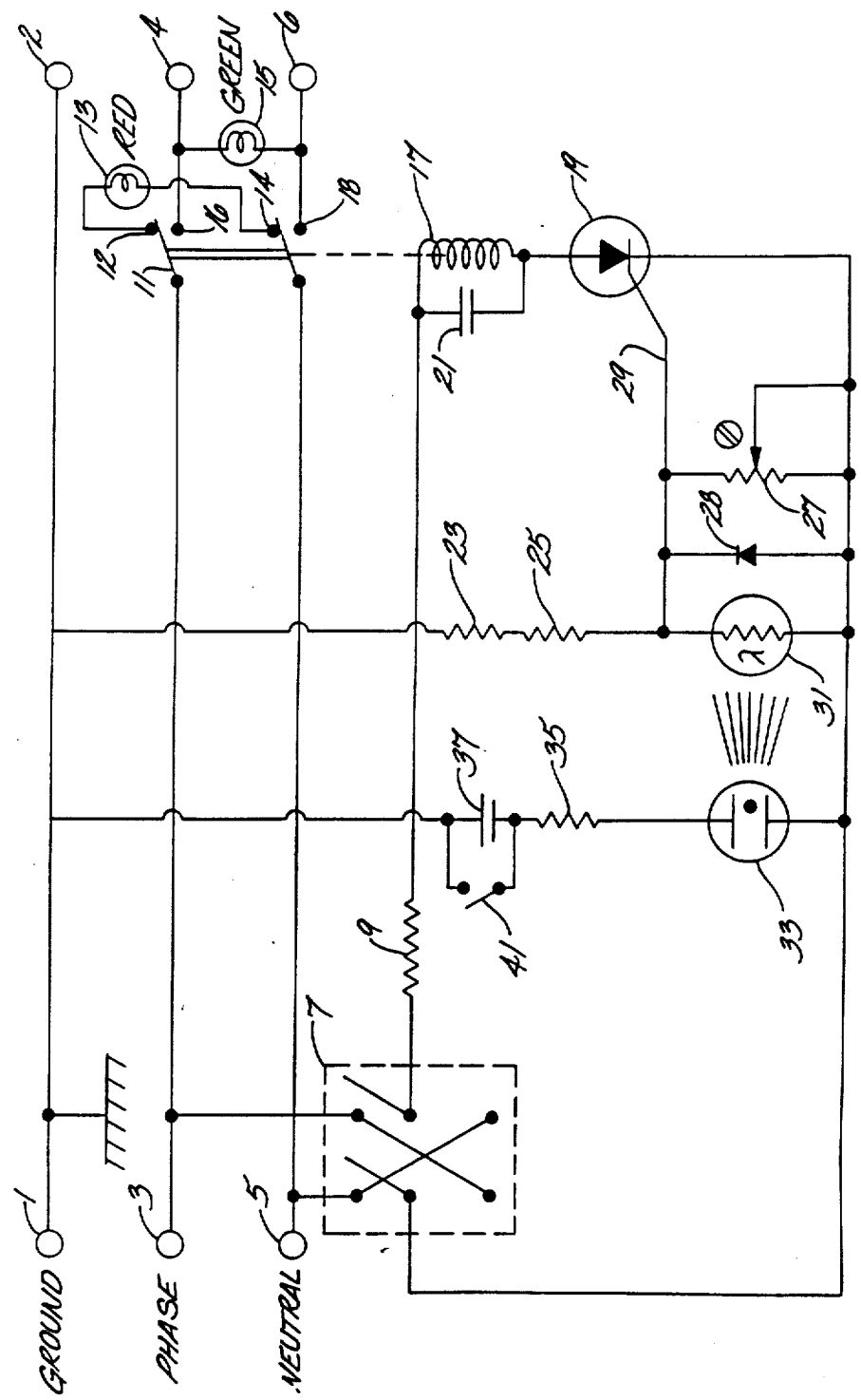

UNITED STATES PATENT AND TRADEMARK OFFICE
CERTIFICATE OF CORRECTION

PATENT NO. : 5,105,325

DATED : April 14, 1992

INVENTOR(S) : Lucas G. Lawrence

It is certified that error appears in the above-identified patent and that said Letters Patent is hereby corrected as shown below:

Column 1, line 36, change "absen" to -- absent --.

Column 3, lines 55, 56, change "reactance" to -- impedance --.

Column 4, line 15, change "verses" to -- versus --.

Column 4, line 27, change "shut offs" to -- shuts off --.

In the Claims:

Column 6, line 4, delete "pl" before "picofarads".

Signed and Sealed this

Twenty-fourth Day of August, 1993

Attest:

Attesting Officer

BRUCE LEHMAN

Commissioner of Patents and Trademarks